(12) United States Patent
Wong et al.

(10) Patent No.: US 8,608,838 B2
(45) Date of Patent: Dec. 17, 2013

(54) TUBING AIR PURIFICATION SYSTEM

(75) Inventors: Tin Cheung Wong, Hong Kong (CN); Yee Tak Leung, Hong Kong (CN)

(73) Assignee: Yau Lee Innovative Technology, Ltd., Hong Kong (CN)

( * ) Notice: Subject to any disclaimer, the term of this patent is extended or adjusted under 35 U.S.C. 154(b) by 413 days.

(21) Appl. No.: 13/007,082

(22) Filed: Jan. 14, 2011

(65) Prior Publication Data

US 2011/0179950 A1    Jul. 28, 2011

Related U.S. Application Data

(60) Provisional application No. 61/297,500, filed on Jan. 22, 2010.

(51) Int. Cl.
    *B03C 3/30*        (2006.01)

(52) U.S. Cl.
    USPC ............ 96/17; 55/DIG. 38; 96/62; 96/98; 96/100

(58) Field of Classification Search
    USPC .............. 96/17, 60, 62, 64, 69, 98–100; 55/DIG. 38
    See application file for complete search history.

(56) References Cited

U.S. PATENT DOCUMENTS

| | | | | |
|---|---|---|---|---|
| 2,592,508 A * | 4/1952 | Phyl | | 96/98 |
| 2,926,749 A * | 3/1960 | Oswald | | 96/98 |
| 3,623,295 A * | 11/1971 | Shriner | | 96/17 |
| 3,736,727 A * | 6/1973 | Shriner | | 96/17 |
| 3,907,520 A * | 9/1975 | Huang et al. | | 95/62 |
| 4,052,983 A * | 10/1977 | Bovender | | 128/204.12 |
| 4,072,477 A * | 2/1978 | Hanson et al. | | 95/71 |
| 5,156,658 A * | 10/1992 | Riehl | | 96/64 |
| 5,348,571 A * | 9/1994 | Weber | | 96/68 |
| 5,681,374 A * | 10/1997 | Von Glehn | | 96/16 |
| 5,716,431 A * | 2/1998 | von Glehn | | 96/17 |
| 5,728,199 A * | 3/1998 | von Glehn | | 96/17 |
| 5,888,274 A * | 3/1999 | Frederick | | 95/59 |
| 6,152,988 A * | 11/2000 | Plaks et al. | | 95/58 |
| 7,594,954 B2 | 9/2009 | Riskin | | |
| 8,246,720 B2 * | 8/2012 | Pant et al. | | 95/58 |
| 2004/0226448 A1 * | 11/2004 | Griffiths et al. | | 96/67 |
| 2007/0283810 A1 * | 12/2007 | Besi | | 96/64 |
| 2007/0283903 A1 * | 12/2007 | Bologa et al. | | 122/4 R |

* cited by examiner

*Primary Examiner* — Richard L Chiesa
(74) *Attorney, Agent, or Firm* — Oliff & Berridge, PLC

(57) ABSTRACT

The invention provides an air purification system in form of tubing, by which particulates of various sizes in the air flow can be collected. The system includes an air inlet, an air outlet and a particulate removing unit located therebetween, the particulate removing unit including a tubing array of material having low dielectric constant, when an air flow passes through the system electrostatic effect is created between the air flow and the tubing material so as to remove the particulates entrained within the air flow. The invention also provides a method for removing particulates from air flow using the electrostatic effect created between the air flow and said material.

15 Claims, 2 Drawing Sheets

TUBING AIR PURIFICATION SYSTEM

TECHNICAL FIELD

The invention relates to an air purification system for removing dust particulates of various sizes contained in the air flowing therethrough.

BACKGROUND

Various types of air purification system are known in the art. For example, dust filtering screens and/or dust collecting bags are widely used in traditional air purification systems, in which the dust particles are arrested on the dust filtering screens or in the dust collecting bags. This air purification method has an advantage of simplicity; however, it requires cleaning or replacing the dust filtering screens or the dust collecting bags on regular basis, and thus is very inconvenient and also uneconomical. In the meantime, the existence of dust filtering screens or dust collecting bags will also create a relatively high air resistance. This air resistance will block the air flow motion, and therefore lower the efficiency of dust particulate removal.

U.S. Pat. No. 7,594,954 discloses an air purification system which can collect dust particulates from air flow by means of electrostatic effect. To this end, this air purification system includes an electrostatic filter, which is provided with several electrodes, including a discharge electrode and a passive electrode being connected to high-potential and low-potential terminals of high voltage power supply respectively. Although achieving a more or less satisfactory dust particulate efficiency, the electrostatic filter requires a high voltage power supply to generate electrostatic effect, which not only increases the operation cost but also complicates the structure of the system.

SUMMARY OF THE INVENTION

In order to eliminate some or all of the above mentioned problems, the present disclosure aims to provide an air purification system with no extra power supply, which can collect dust particulates with different sizes from the air flowing through the system in an efficient way.

This objective is achieved by an air purification system that can create electrostatic effect therein in a spontaneous manner. The system comprises a housing with air inlet and air outlet, and at least one dust particulate removing unit. Surrounding air is introduced into the housing via the air inlet, then flows through the dust particulate removing unit, and is finally discharged out of the housing via the air outlet. According to the present disclosure, the dust particulate removing unit includes a tube array consisting of a plurality of tubes. The material of the tubes is selected so that electrostatic effect will be created when air flows through the tubes. Therefore, dust particulate contained within the introduced air flow can be removed therefrom by the electrostatic effect created, without a need of extra power supply.

As known, static electricity can be generated by touching two differing surfaces together and then separating them due to the phenomena of contact electrification and the triboelectric effect. When air flows through a certain surface, the molecules or atoms of air will experience the above mentioned touching-and-separating motion phase, and thus a surface charge imbalance will be generated, which yields static electricity finally. Under this principle, the air purification system according to the present disclosure can remove the dust particulates from air flow by means of electrostatic effect generated spontaneously. Since no extra power supply is needed, the whole system can be operated at a low cost, and the structure of the system can be simplified. In the meantime, the dust particulate removing unit in form of tube array also results in a lightweight structure, Moreover, since no filtration material such as dust filtering screen is necessary, the air flow motion will not be inappropriately blocked.

In an embodiment, the system comprises at least two dust particulate removing units, Preferably, the static electricity generated in one dust particulate removing unit has an opposite polarity to that generated in the dust particulate removing unit adjacent to said dust particulate removing unit, Materials that can generate positive or negative static electricity are well known in the art, and can be suitably selected by one skilled in the art. In this way, the dust particulate removing efficiency can be significantly increased by the opposite polarities of static electricity generated in two adjacent dust particulate removing units.

In another embodiment, the upstream ends, with respect to the air flow direction, of different tubes in one single dust particulate removing unit are located at different longitudinal positions. Additionally or alternatively, the end faces of the upstream ends of tubes are tilted to the longitudinal direction of tubes. This arrangement can also enhance the static electricity generated, and thus increase the dust particulate removing efficiency.

According to a further embodiment, with respect to the air flow direction, tubes of the upstream dust particulate removing unit have a larger diameter than those of the downstream dust particulate removing unit. Additionally or alternatively, the axes of tubes in one dust particulate removing unit deviate from those in the dust particulate removing unit adjacent to said one dust particulate removing unit. Preferably, the deviation is equal approximately to the radius of tube.

The tube array in the dust particulate removing unit is mainly provided for removing relatively fine particulates from the air flow. To remove some larger particulates, a dust particulate collector is provided directly under the compartment formed between two adjacent dust particulate removing units. The dust particulate collector advantageously comprises two partial cylinders communicating with each other but with different sizes, and the smaller one is connected to the bottom side of the housing. In this way, larger dust particulates will be effectively trapped inside the side collector.

Optionally, an air flow guide is provided in or near the air inlet for introducing the outside air into the housing in a direction non-parallel to the longitudinal direction of tubes. Additionally or alternatively, other air flow guides are provided inside the housing for changing the air flow direction and/or rate. By means of these air flow guide, the electrostatic effect can be enhanced.

The air purification system according to the present disclosure can be used in many outdoor or indoor conditions. For example, it can be installed outside a car so that dust will be collected when the car is moving. Moreover, it can be installed at places in a windy environment such as roadside or anywhere inside a building. In addition, it can also be installed on the roof of building so that dust will be collected when normal air stream pass through the system. Obviously, mounting the air purification system on the above mentioned locations is cheap and simple.

BRIEF DESCRIPTION OF DRAWINGS

The accompanying drawing is provided to facilitate the understanding of the present disclosure. It constitutes a part of the specification but does not restrict the scope of the present disclosure in any aspects. In the drawing.

DESCRIPTION OF THE INVENTION

In the following the present disclosure will be explained in a detailed way with reference to the accompanying drawings.

Figure 1:
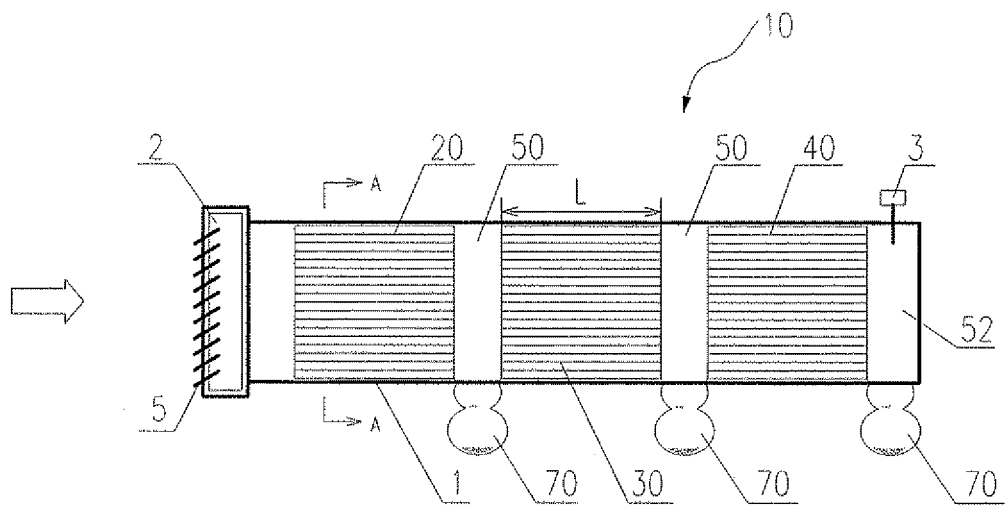
FIG. 1 shows the tubing air purification system according to the invention in a cutaway view.

As shown in FIG. 1, the air purification system 10 according to the present disclosure is provided with a housing 1. The housing, in the example as shown in FIG. 1, is shaped as a cuboid box. However, one skilled in the art will understand that other shapes of the housing 1, such as toroid, parallellepipe etc., also fall within the scope of the present disclosure. An air inlet 2 and an air outlet 3 are located on the front side and rear side of the housing 1 respectively. Surrounding air can be introduced, as shown by the arrow, in the housing 1 through the air inlet 2, and then discharged from the housing 1 through the air outlet 3 after being treated in the air purification system 10. If necessary, an extraction fan (not shown) can be optionally placed near the air inlet 2 so as to maintain a desirable air flow rate.

Figure 2:
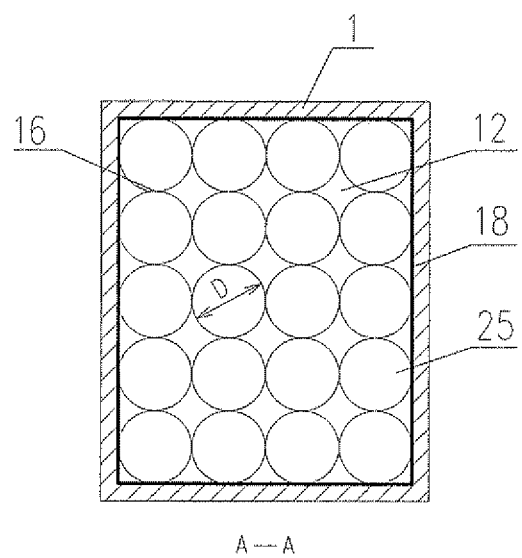
FIG. 2 shows the cross-sectional view of the tubing air purification system along line A-A shown in FIG. 1.

According to the present disclosure, the air purification system 10 comprises at least one dust particulate removing unit 20, which is in a form of an array of hollow tubes 25 (which are best shown in FIG. 2). The dust particulate removing unit 20 is structured as a modular unit. Therefore, it can be easily taken out from the housing 1 via an access door (not shown) located in a side of the housing 1 for cleaning or replacement, and then reinserted therein after suitable treatments. As an example, the dust particulate removing unit 20 can be cleaned with ultrasonic means.

FIG. 2 is the cross-sectional view of the air purification system 10 along line A-A, which shows, as an example only, the arrangement of the tubes 25 within a dust particulate removing unit 20. The tube array as shown is a regular array consisting of a total of 20 tubes, in 5 rows and each row 4 tubes. Of course, it is understood that the tube array can be an irregular array so as to be adapted for different shapes of the housing 1. As shown in FIG. 2 also, the tubes 25 are held together by means of a holding element 18 so that a modular unit is obtained. In one example, the holding element 18 is an adhesive tape wrapped around the tube array. Of course, the tubes 25 can be also held together through directly applying adhesive to the contact areas 16 of tubes 25.

The tubes 25 in the dust particulate removing unit 20 can be made of materials having low dielectric constant, for example, nylon, silicone rubber, etc. Therefore, when air flows through the tube array electrostatic effect will be created around each of the tubes in a nature way due to the touching-separating interaction between the air flow and the surfaces of tubes 25. Such spontaneously generated electrostatic effect is capable of capturing fine particulates, e.g. with a size less than 10 μm, from the incoming air flow, and causes the captured dust particulates being adhered to the outer surfaces of the tubes. Therefore, the dust particulates contained in the air introduced in the housing 1 can be removed from the air flow and thus disposed within the spaces 12 formed among the outer surfaces of the tubes 25. Then, after passing through the tube array, the air with little or no dust particulates will be discharged out of the air purification system 10 into the surroundings through the air outlet 3. In this manner, the dust particulates can be removed from the introduced air by means of electrostatic effect generated spontaneously; thus there is no need for an extra power supply. Consequently, the whole air purification system 10 can be operated at a low cost. In the meantime, since the extra power supply as in the prior arts is unnecessary, the structure of the air purification system 10 is significantly simplified. Moreover, due to the structure of tube array, the whole dust particulate removing unit and thus the air purification system is light-weighted. Further, in an example the tube 25 can be implemented in form of a drinking straw, leading to a very cost-effective structure.

For effectively creating electrostatic effect in the tube array, it is suggested to increase the touching-separating interaction between the air flow passing through the tube array and the surfaces of the tubes. As shown in FIG. 1, an optional air flow guide 5 is provided in or near the air inlet 2. The air flow guide 5 can be implemented as a plurality of vanes which are oriented in a direction non-parallel with the longitudinal direction of the housing 1, i.e., the longitudinal axes of the tubes 25. Therefore, when air is introduced into the housing, it flows at a certain angle with respect to the longitudinal axes of the tubes 25. In this case, the touching-separating interaction between the incoming air flow and the surfaces of the tubes is enhanced, and therefore a high level of electrostatic effect is obtained, which is advantageous for dust particulate removing. Moreover, the housing can be further provided with additional air flow guides for changing the air flow direction and/or rate inside the housing; therefore, the touching-separating interaction can be further enhanced. For example, the additional air flow guide can be implemented as deflection plate, flow restriction structure, and so on, and may be placed in the compartment 50 formed between two adjacent dust particulate removing units.

In another example, the electrostatic effect can be also enhanced by selecting a certain geometric parameters of tubes 25. Tests show that a satisfactory electrostatic effect is obtained if the ratio of the length L of tube 25 to the diameter D thereof is no more than 10, i.e. L≤10D. As a rule, the diameter D of tube 25 generally ranges from 5 to 10 mm; in this case, the length L thereof can be selected as less than 50 to 100 mm correspondingly. According to a particular embodiment, the diameter D of tubes is 5 mm, the length L thereof is 50 mm, the tubes are made of PVC and the flow rate of the incoming air is 1 m/s, then the dust particulate removing efficiency can be as high as 10-35%.

Figure 3:
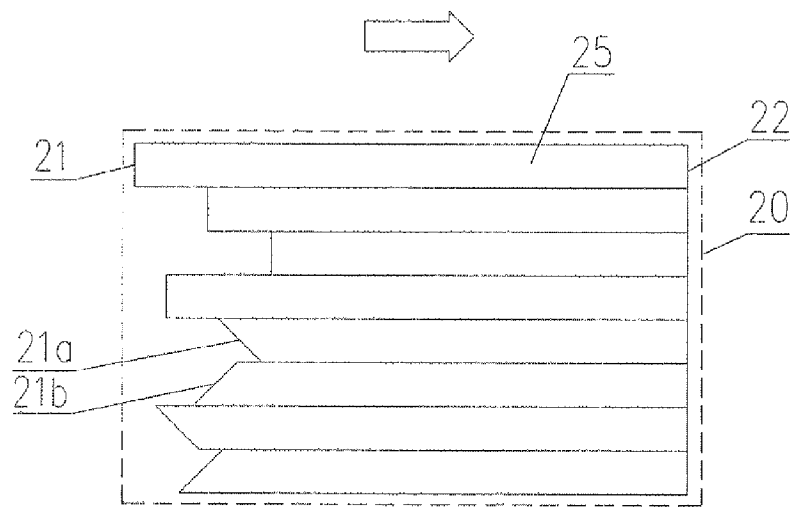
FIG. 3 shows the side view of tubes in one dust particulate removing unit.

FIG. 3 shows an advantageous variant for tube structure according to the present disclosure, In the dust particulate removing unit 20 as shown, although the downstream ends 22 (defined with respect to the air flow direction, which is shown by the arrow indicated in the drawing) of all tubes 25 terminate at one and the same vertical plane, their upstream ends 21 do not locate in one and the same vertical plane; in other words, the upstream end 21 of each tube 25 in one unit does not start from the same longitudinal position. Therefore, a so-called fractal arrangement is obtained. Additionally or alternatively, the upstream ends of some tubes 25 can form an acute angle with respect to the longitudinal direction, as shown at 21a, 21b in the bottom part of the drawing. Preferably, the upstream end of a tube forms a positive acute angle with respect to the longitudinal direction while that of the adjacent tube forms a negative acute angle with respect to the longitudinal direction. With the fractal arrangement or the tilt end face or the combination thereof, the above mentioned touching-separating interaction can be further enhanced, thus leading to a strong electrostatic effect.

Referring back to FIG. 1, the air purification system 10 according to the present disclosure comprises two or more dust particulate removing units arranged one behind another along the longitudinal direction of the housing 1. Thus a compartment 50 is formed between every two dust particulate removing units. In the example shown in FIG. 1, three modular dust particulate removing units 20, 30, 40 are provided in the housing one behind another, and consequently two compartments 50 are formed between the three units 20, 30, 40. Optionally, an additional compartment 50 can be provided just before the air outlet 3. Obviously, the air purification system according to the present disclosure can include more dust particulate removing units and compartments, and the quantities of dust particulate removing units and compartments can be selected by one skilled in the art as needed.

As mentioned above, the air purification system 10 according to the present disclosure operates under the electrostatic effect created in the tube array due to the touching-separating interaction between the air flow and the tube surface. In a preferred embodiment, materials of tubes in different dust particulate removing units are different, such that in one unit a positive or negative static electricity is created while in the unit adjacent to said one unit a negative or positive static electricity is created. In other words, the polarities of the static electricity generated in two adjacent dust particulate removing units are opposite to each other. Materials that can generate positive or negative static electricity are well known; for example, rubber fur, glass, nylon and wool etc. can generate positive static electricity, while silicone rubber, Teflon, polypropylene and celluloid etc. can generate negative static electricity. In a preferable embodiment, tubes in a dust particulate removing unit are made of nylon while tubes in the unit therebehind are made of silicone rubber. In this manner, positive static electricity and negative static electricity are alternatively generated in the adjacent dust particulate removing units of the air purification system, and thus the dust removing efficiency can be significantly increased.

In the case of several modular dust particulate removing units being provided, the removing efficiency can be further enhanced by means of selecting diameter of tubes in different dust particulate removing units. For example, tubes in one unit are generally made with equal diameter for the sake of convenience; however, the tube diameter can be gradually reduced in different units along the direction of air flow. In the example as shown in FIG. 1, the diameter of tubes in the dust particulate removing unit 20 is larger than that of the dust particulate removing unit 30, which is in turn larger than that of the dust particulate removing unit 40.

Figure 4:
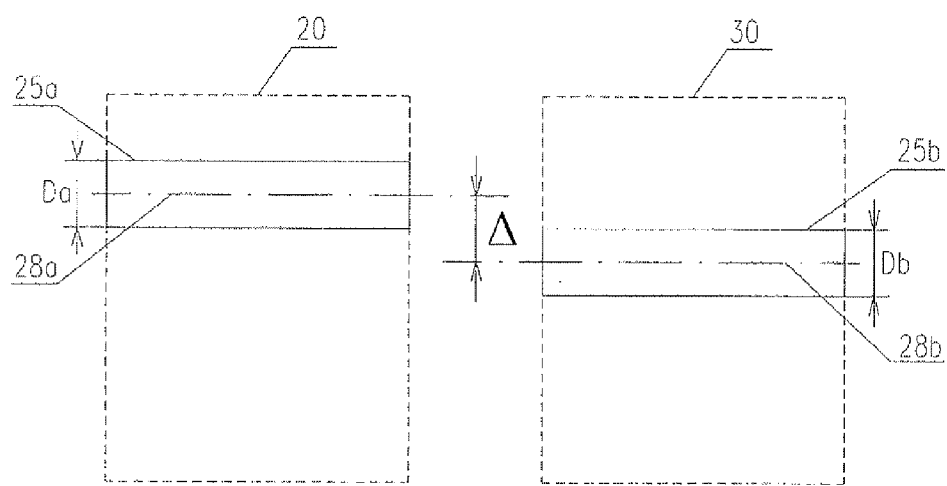
FIG. 4 shows the stagger arrangement of the tubes in two dust particulate removing units adjacent to each other.

As a variant, all the tubes in all the units are of equal diameter; however, the longitudinal axes of tubes in one unit do not align with those in the unit adjacent thereto. As shown in FIG. 4, the longitudinal axis 28a of tube 25a in the dust particulate removing unit 20 deviates from the longitudinal axis 28b of corresponding tube 25b in the dust particulate removing unit 30 by a distance Δ. With this stagger arrangement the electrostatic effect will be further enhanced, and thus the dust particulate removing efficiency can be maximized. As a preferable example, the distance Δ equals to the radius of the tubes.

With electrostatic effect created therein, the dust particulate removing unit is capable of mainly removing relatively fine particulates, say with a diameter less than 10 μm, from the incoming air. However, sometimes there are larger particulates entrapped within the incoming air, which should be desirably removed also. To this end, the compartment 50 between two dust particulate removing units can act as a structure for removing larger particulates. This is achieved by the turbulence phenomenon naturally generated in the compartment when the incoming air flow leaves one unit and is going to enter into another one. Due to the turbulence phenomenon generated in the compartment 50, larger particulates will be trapped into a bottom collector 70 located directly under the compartment 50. To collect larger particulates more effectively, according to an example of the present disclosure, the length L' of the compartment 50 is preferably selected as shorter than the length L of the dust particulate removing unit 20. In a particular embodiment, the length L' of the compartment 50 is less than about half of the length L of the unit 20, i.e., L'≤L/2. Tests show that a favorable result can be obtained when L'≤L/2.

Moreover, in an advantageous embodiment the bottom collector 70 is comprised of two cylinders with different diameters but communicating with each other. In other words, the cross section of the bottom collector 70 is shaped as calabash. The portion of the smaller cylinder is connected to the housing 1. In this way, the larger dust particulates separated from the air flow will be effectively trapped in the larger cylinder of the bottom collector 70 with little possibility of escaping therefrom, and thus the dust removing efficiency can be significantly increased. To facilitate cleaning the dust particulates accumulated therein, the bottom collector 70 is provided with a sealing plug (not shown), which, for example, is located at the bottom of the larger cylinder. The sealing plug can be pulled out so that one can clean the dust particulates accumulated in the bottom collector 70 by suitable tools.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. An air purification system, comprising a housing with air inlet and air outlet and at least one dust particulate removing unit, the air introduced into the housing via the air inlet flowing through the dust particulate removing unit and then being discharged out of the housing via the air outlet,
   wherein the dust particulate removing unit includes a tube array consisting of a plurality of tubes, and material of the tubes is selected so that electrostatic effect will be created when air flows through the tubes, thus removing dust particulate from the air flow by means of the electrostatic effect created;
   upstream ends of different tubes in one and the same dust particulate removing unit with respect to an air flow direction are located at different longitudinal positions; and
   end faces of the upstream ends of the tubes are tilted to the longitudinal direction of tubes.

2. The air purification system of claim 1, wherein the system comprises at least two dust particulate removing units.

3. The air purification system of claim 2, wherein the static electricity generated in one dust particulate removing unit has an opposite polarity to that generated in the dust particulate removing unit adjacent to said dust particulate removing unit.

4. The air purification system of claim 3, wherein material of tubes in one dust particulate removing unit is selected from a group at least consisting of rubber fur, glass, nylon and wool, while material of tubes in the dust particulate removing unit adjacent to said one dust particulate removing unit is selected from a group at least consisting of silicone rubber, Teflon, polypropylene and celluloid.

5. The air purification system of claim 1, wherein length L and diameter D of tubes meet the relationship of $L \leq 10D$.

6. The air purification system of claim 2, wherein with respect to the air flow direction, tubes of the upstream dust particulate removing unit have a larger diameter than those of the downstream dust particulate removing unit.

7. The air purification system of claim 2, wherein a tube axis in one dust particulate removing unit deviates from that in the dust particulate removing unit adjacent to said one dust particulate removing unit.

8. The air purification system of claim 7, wherein the deviation distance is equal approximately to the radius of a tube.

9. The air purification system of claim 2, wherein a dust particulate collector is provided directly under a compartment formed between two adjacent dust particulate removing units.

10. The air purification system of claim 9, wherein the dust particulate collector comprises two partial cylinders communicating with each other but with different sizes, the smaller cylinder being connected to the housing.

11. The air purification system of claim 10, wherein the larger cylinder of the dust particulate collector is provided with a sealing plug, which can be pulled out for cleaning the dust particulates accumulated therein.

12. The air purification system of claim 1, wherein an air flow guide is provided in or near the air inlet for introducing outside air into the housing in a direction non-parallel to the longitudinal direction of tubes.

13. The air purification system of claim 12, wherein additional air flow guides are provided in the housing for changing the air flow direction and/or rate.

14. The air purification system of claim 1, wherein tubes in one tube array are held together by means of a holding element so that the tube array can be mounted into the dust particulate removing unit as a whole.

15. The air purification system of claim 1, wherein the housing is provided with an access door in order to remove the dust particulate removing unit for cleaning or replacement.

* * * * *